United States Patent
Wilhelmi et al.

(10) Patent No.: US 8,026,457 B2
(45) Date of Patent: Sep. 27, 2011

(54) LASER PROTECTION ARRANGEMENT WITH SAFETY CUTOFF

(75) Inventors: Bernd Wilhelmi, Jena (DE); Ulf Feistel, Laasdorf (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 870 days.

(21) Appl. No.: 11/936,415

(22) Filed: Nov. 7, 2007

(65) Prior Publication Data

US 2008/0112447 A1    May 15, 2008

(30) Foreign Application Priority Data

Nov. 10, 2006   (DE) .................. 10 2006 053 579

(51) Int. Cl.
*B23K 26/00* (2006.01)
*B23K 26/42* (2006.01)
*G21F 7/00* (2006.01)

(52) U.S. Cl. .............. 219/121.6; 219/121.86; 250/515.1

(58) Field of Classification Search ............. 219/121.6, 219/121.86; 250/515.1, 517.1
See application file for complete search history.

(56) References Cited

U.S. PATENT DOCUMENTS

| | | | | |
|---|---|---|---|---|
| 4,575,610 A | * | 3/1986 | Gavin | 250/515.1 |
| 4,710,606 A | | 12/1987 | Soroka et al. | |
| 4,901,738 A | * | 2/1990 | Brink et al. | 250/515.1 |
| 5,151,095 A | | 9/1992 | Teeple, Jr. | |
| 5,163,504 A | * | 11/1992 | Resnick | 250/515.1 |
| 5,306,373 A | * | 4/1994 | Swan | 250/515.1 |
| 5,796,335 A | * | 8/1998 | Droege et al. | 340/550 |
| 6,518,586 B1 | * | 2/2003 | Heberer | 250/515.1 |
| 2001/0054607 A1 | | 12/2001 | Pratt et al. | |
| 2004/0052279 A1 | * | 3/2004 | Miyairi et al. | 372/33 |

FOREIGN PATENT DOCUMENTS

| | | | |
|---|---|---|---|
| EP | 321965 A2 | * | 6/1989 |
| EP | 1674194 A1 | * | 6/2006 |
| EP | 1746334 A2 | * | 1/2007 |
| GB | 1 595 201 | | 8/1981 |
| GB | 2 108 742 | | 5/1983 |
| GB | 2182746 A | * | 5/1987 |
| WO | WO-01/14787 A1 | * | 3/2001 |

* cited by examiner

*Primary Examiner* — Geoffrey S Evans

(74) *Attorney, Agent, or Firm* — Frommer Lawrence & Haug LLP

(57) ABSTRACT

Laser protection arrangement with a safety cutoff comprising a passive laser protection wall which stores the radiation energy of impinging radiation of a laser of a laser material processing installation, a laser protection foil which causes a detectable change when struck by laser radiation and which is arranged in front in direction of the laser radiation, and at least one sensor which is connected to the laser by a threshold switch in order to switch off the laser when the received detector signal exceeds or falls below a threshold value.

10 Claims, 1 Drawing Sheet

LASER PROTECTION ARRANGEMENT WITH SAFETY CUTOFF

CROSS-REFERENCE TO RELATED APPLICATION

This application claims priority of German Application No. 10 2006 053 579.0, filed Nov. 10, 2006, the complete disclosure of which is hereby incorporated by reference.

a) FIELD OF THE INVENTION

The invention is directed to a laser protection arrangement for application in laser material processing.

b) DESCRIPTION OF THE RELATED ART

In laser material processing, hazards can arise on one hand through the direct action of laser radiation on humans or sensitive objects, e.g., as a result of faulty control, and on the other hand through materials in gaseous, liquid or particulate form which are ablated in the course of processing.

Quantities of laser irradiation which are harmless to humans are specified as a function of radiation properties (wavelength, output or pulse energy, time modulation, active time period) in national and international guidelines.

The danger posed by ablated material is usually not laser-specific and is regulated in general rules for the handling of hazardous gaseous substances such as aerosols and dust particles.

Particular risks occur, for example, in the processing of organic materials (e.g., natural and synthetic materials such as textiles, leather, composite materials), where even small concentrations of burned up waste can be hazardous to health. This is particularly true of the fine particles of inorganic materials.

In industrial installations, hazards are generally averted through suitable enclosure of lasers and processing objects (workpieces) and the mechanical installations (e.g., articulated-arm robots, gantries) which adjust and modify the relative position of the beam and workpiece programmably in a booth which allows neither radiation nor ablated material to exit during operation of the laser. In this case, a suitable exhaust, possibly provided with filters, is generally used.

Enclosures of this type which are known from the prior art can be classified into passive enclosures and active enclosures or laser protection walls.

Passive laser protection walls, including windows and doors, are designed such that they withstand full laser irradiation, such as can occur from incorrect orientation of the beam, over a given period of time without impairment of the protective action.

It is disadvantageous that booths comprising passive laser protection walls not only occupy a relatively large space but are also heavy and engender high investment and operating costs. Also, the required exhaust capacities (and, consequently, the expenditure on exhaust) increase with the size of the booth. Because of the size and great bulk, the laser material processing installations can only be used at various locations by a relatively large expenditure. These disadvantages are particularly pronounced in medium-size laser processing installations (in the power range of about 100 W to about 1 kW) which it would be desirable to integrate into flexible processing chains.

In contrast to the above-mentioned passive laser protection walls, active laser protection walls not only passively prevent penetration of the laser radiation through their dimensioning and material characteristics, but also switch off the laser radiation immediately when the laser radiation strikes the laser protection wall. Accordingly, the requirements for booth walls (including windows and doors) can be eased by reducing the maximum possible storage of radiation before a safety cutoff. By reducing the wall thickness and/or the use of other wall materials, wall mass and cost can be reduced with the booth geometry remaining the same. Further, modified booth constructions can be used in which the walls enclose only the immediate surroundings of the respective processing location more or less flexibly.

A great many solutions for active laser protection walls are known from the prior art.

DE G 89 08 806 U1, which is based on a prior art according to which the laser processing process must be attentively observed by the worker so that the emergency switch can be actuated in case of anomaly, describes a protective arrangement for a laser processing machine comprising side walls, which surround the work area and which are at least partly movable, and an emergency cutoff. A current-carrying conductor, e.g., in the form of loops, acting with the emergency cutoff as a safety fuse is integrated in the side walls. The conductor is advantageously arranged in a zigzag manner between composite disks, i.e., an inner, transparent synthetic resin disk and an outer glass disk. The conductors of a plurality of side walls can be connected in series or individually to the emergency cutoff.

A shield according to GB-A 1595201 is formed by two layers which are at a distance from one another and define a closed chamber, and one of the layers can be destroyed by the laser. EP 0 157 221 B1 discloses a laser protection arrangement which is distinguished from the above arrangement in that the shield is transportable and freestanding and the chamber is filled with a gaseous medium and a sensor is provided which reacts to the gas flow following the destruction of a layer. The pressure in the chamber can diverge from atmospheric pressure (also vacuum pressure) and the sensor reacts to changes in pressure in the chamber. Alternatively, the chamber can contain a detectable gas and the sensor detects this gas. The sensor can be connected to an alarm device or a cutoff.

DE 199 40 476 A1 shows a laser protection wall which has at least one sensor, e.g., a heat sensor or a light sensor, that detects laser radiation.

DE 36 38 874 A1 is directed to a two-layer viewing window in a protective device with an electric conductor running between the layers. When the laser burns a hole in the inner layer, the conductor, which is part of a safety cutoff for controlling the laser source, melts and the laser is switched off before it can also penetrate the outer layer. Alternatively, the change in resistance of the conductor resulting from an increase in temperature is measured and an acoustic or optical warning signal is generated. The conductor is arranged, e.g., in a wavy or zigzagging shape, at distances which are less than the beam diameter at the point of incidence.

A similar device is disclosed in U.S. Pat. No. 4,710,606.

EP 0 321 965 B1 discloses a laser protection wall of transparent material which directs the impinging laser radiation to an integrated illumination device, e.g., a photodiode, that generates an electric signal depending on the illumination intensity. A laser protection wall of this kind has the advantage that no fine-meshed net of conductor wires is required and that there is no destruction and therefore no need for replacement.

All of the active laser protection walls mentioned above have in common that they have a laser radiation-sensitive element, i.e., an element which undergoes a state change when acted upon by the laser radiation, which results in the laser being switched off. The laser radiation-sensitive element forms either a closed surface or a grid-shaped or net-like surface within or on a side of the laser protection wall, wherein the grid spacing or net mesh size is not greater than the beam diameter of any possibly impinging laser beam.

In almost all of the solutions mentioned above, the laser radiation-sensitive element, e.g., a safety fuse or a chamber-enclosing layer, is at least partially destroyed when acted upon by laser radiation so that the laser protection wall must be exchanged in order to restore safety.

The dependability of the solutions in which the laser radiation-sensitive element, e.g., a transparent surface for conveying the laser radiation to a radiation sensor, is not destroyed appears questionable.

OBJECT AND SUMMARY OF THE INVENTION

It is the primary object of the invention to provide a laser protection arrangement comprising at least one laser protection wall which works dependably and which must be replaced after being struck by laser radiation in order to maintain absolute safety.

The invention is based on the idea of carrying out the two functions of an active laser protection wall, namely, first, to cause the laser to be immediately switched off after the impingement of laser radiation and, second, to ensure a passive laser protection in order to store the amount of impinging radiation before cutoff, by materially separate means, i.e., by a device for active protection and a device for passive protection.

The device for passive protection can be any conceivable passive laser protection wall which is designed such that it can store the impinging amount of radiation before the safety cutoff. It is preferably designed in such a way that it does not undergo any irreversible changes in doing so.

The device for active protection is a foil which is either itself a laser-sensitive element or is incorporated in or arranged on a laser-sensitive element.

According to the invention, the foil, hereinafter laser protection foil, is arranged in front of the passive laser protection wall in the radiation direction. In general, it is damaged when struck by laser radiation and must subsequently be exchanged to restore safety. On the other hand, the laser protection wall arranged behind it need not be exchanged, which economizes on costs and resources. Compared to all of the solutions for active laser protection walls known from the prior art, a laser protection arrangement which comprises a passive laser protection wall with a laser protection foil arranged in front of it according to the invention is appreciably cheaper in the long term and safety can be restored more quickly and more simply.

By dividing the two above-mentioned functions of the laser protection arrangement between two materially separate devices, a further advantage is achieved in that the entire work space of the laser need not necessarily be enclosed; that is, in order for laser radiation exiting from the work space to be contained in all instances, the work space is completely surrounded by the laser foil, but a passive laser protection wall need not necessarily be arranged behind the laser protection foil in every spatial direction, e.g., toward the shop ceiling, but only in the areas in which the laser radiation could affect persons or sensitive objects at a dangerous intensity.

For some constructions of the laser protection foil, the surface area of a passive laser protection wall to accompany it need not be taken into account already during manufacture, so that it can also be stocked in an unfinished state and cut to the required dimensions as needed. This makes exchange even cheaper and simpler.

It is advantageous that the unimpaired functionality of the laser protection foil can be checked at any time. This can be achieved for the individual constructions of the laser protection foil either by an obvious destruction or can be indicated by means of a sensor signal.

The invention will be described more fully in the following with reference to a number of embodiment examples shown in the drawings.

DESCRIPTION OF THE PREFERRED EMBODIMENTS

Figure 1:
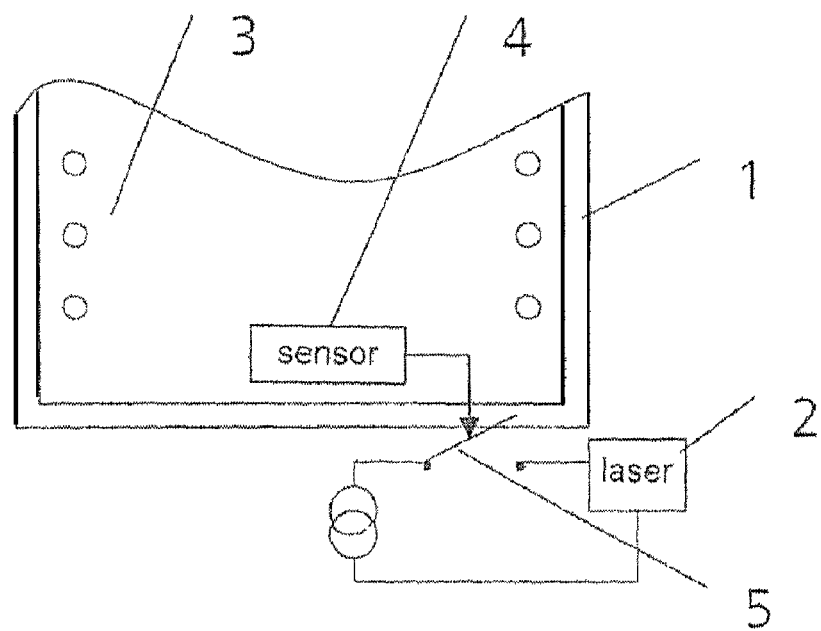
FIG. 1 shows a basic view of a first embodiment example of a laser protection arrangement.
Figure 2:
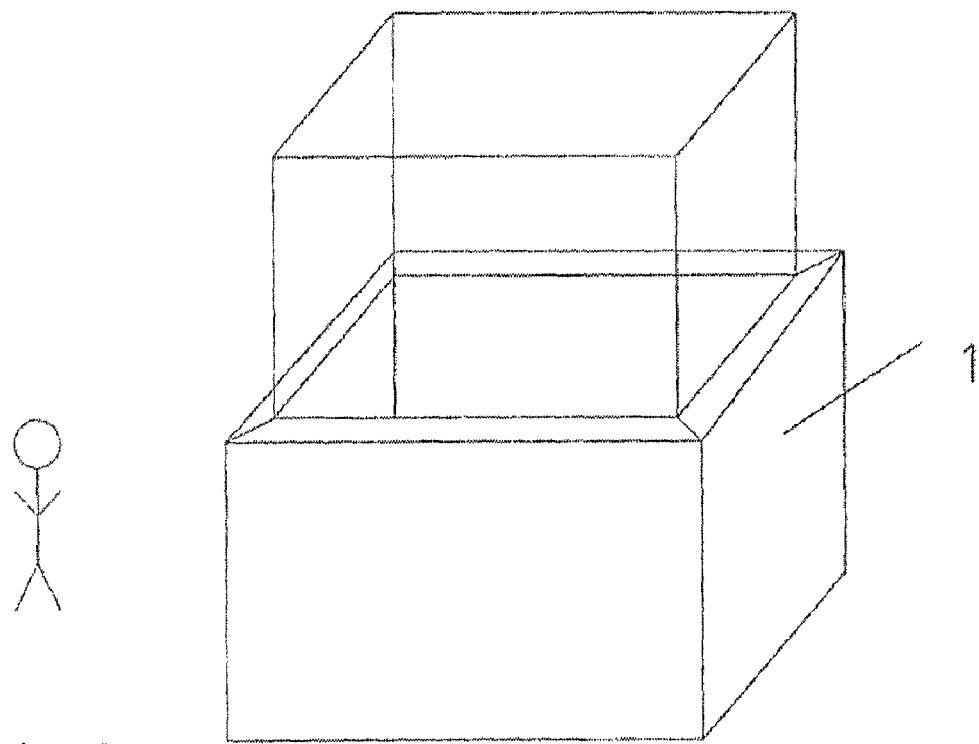
FIG. 2 shows a laser protection booth formed by a plurality of laser protection arrangements.

A laser protection arrangement according to the invention (FIG. 1) which prevents a laser beam of a laser material processing installation from exiting its work area comprises a passive laser protection wall 1, a laser protection foil 3, at least one sensor 4, and a threshold switch 5 by which a laser 2 of the laser material processing installation is connected to an energy source 6.

A plurality of laser protection arrangements of the type mentioned above can be assembled to form a laser protection booth so that a plurality of threshold switches 5 are connected in series between the laser 2 and the energy source 6.

In a first embodiment example, the laser protection foil 3 is a thin foil of expandable material with a thickness between 0.2 mm and 2 mm and is stretched in an expanded state in front of or on a passive laser protection wall 1 located behind it. At least one expansion sensor which senses tensile strain is provided on the laser protection foil 3.

The laser protection foil 3 is preferably expanded in only one direction, and the expansion sensor is an expansion measurement strip which adheres to the foil in the expansion direction. When struck by laser radiation, the foil is destroyed at the point of incidence and a tear forms proceeding from the point of incidence and extending substantially perpendicular to the expansion direction and leads to a reduction in the tensile strain in the foil. When the tensile strain falls below a predetermined threshold, the laser 2 is switched off by a threshold switch 5 communicating with the expansion measurement strip and the laser 2.

Because the laser protection foil 3 is stretched in front of the laser protection wall 1 in a positive or frictional engagement only by holding elements, the destroyed laser protection foil 3 can be removed simply by loosening the holding elements and replacing it with a new laser protection foil 3. Since the laser protection foil 3 can be finished in any size, a passive laser protection wall 1 can be covered by an individual large laser protection foil 3 or by a plurality of correspondingly small laser protection foils 3. Exchange is facilitated by the latter alternative.

A laser protection arrangement with a laser protection foil 3 according to the first embodiment example is particularly advantageous for forming laser protection booths in many different configurations which completely enclose the work space of the laser material processing installation.

A laser protection booth of the type mentioned above basically comprises a plurality of side walls of the same height which stand vertically and are connected to one another by their longitudinal sides so as to form a closed base and a ceiling closing at the top. A door and frequently also a window are integrated in the side walls.

In order to optimally adapt the base of the booth to the work space of the laser material processing installation, it is often useful to construct the booth in different widths. In the laser protection walls of the prior art, this led to the problem that a replacement had to be stocked for every width so that safety could be restored immediately when needed.

A laser protection foil 3 according to the first embodiment example can be stocked on a roll in unfinished state by the meter, cut immediately before use as needed, and provided with an expansion measurement strip.

The laser protection foil 3 can also be used by itself as a ceiling without a passive laser protection wall 1 arranged behind it. In this case, it is also preferably stretched only in one direction regardless of the shape of the ceiling area which is basically identical to the shape of the base area. The laser protection booth is accordingly reduced in mass, while nevertheless ensuring that no gases occurring during processing can penetrate to the outside and that the laser 2 is switched off when laser radiation exits the work space due to faulty control. The shop ceiling, which is often located above the ceiling of the laser protection booth, is far enough away from the laser 2 that the radiation intensity cannot cause any damage when striking the shop ceiling.

For laser processing installations whose work space is substantially higher than the size of a person for whom the protection is provided in particular, a laser protection side wall can also be constructed in such a way that the passive laser protection wall 1 ends, e.g., at a height of 2.20 m and the total height is lengthened by an open frame, the laser protection foil 3 being clamped in the open frame.

The laser protection foil 3 need not be stretched by holding elements which are located at the passive laser protection wall 1, but can also be erected, e.g., in a freestanding frame in front of the passive laser protection wall 1.

In a second embodiment example, at least one electric conductor path is embedded in or arranged on the laser protection foil 3. The conductor paths are arranged in a finished laser protection foil 3 in such a way that the distance between two adjacent conductor paths is always smaller than the diameter of a laser beam at the point of incidence in order to ensure than the conductor path is struck regardless of where the laser beam strikes the laser protection foil 3. The conductor paths are connected by one end to a current source or voltage source and by the other end to a measurement device via contacts. In principle, one conductor path per laser protection foil 3 is sufficient. It is preferably arranged in a sine-shaped or zigzag shape.

When the laser beam strikes a conductor path, its resistance changes first due to heating and melts when acted upon again by radiation. The increase in resistance or drop in current or voltage is measured and if the measured quantity exceeds or falls below a predetermined threshold value the laser 2 is switched off by a threshold switch 5.

In a third embodiment example, optical fibers are embedded in the laser protection foil 3 instead of electric conductor paths. To direct the radiation to a radiation detector connected to the fiber ends independent of the angle of incidence of the laser beam, the fiber has a fiber cladding surrounding a fiber core. This fiber cladding is destroyed in a locally limited manner when struck by laser radiation so that the laser radiation enters into the optical fiber and can be directed to the radiation sensor. To ensure that the radiation is reliably coupled into the fibers, the fibers can be arranged using a knitting technique so that they take up a large angle relative to the surface of the laser protection foil 3.

In a fourth embodiment example, optical fibers which are embedded in the laser protection foil 3 are supplied with a modulated laser radiation which is detected by a sensor. When the optical fibers, particularly plastic fibers in this instance, are destroyed, a change in the detected signal is perceived.

A laser protection foil according to the invention can also comprise electrically or optically conducting layers instead of electric or optical conductor paths.

Accordingly, for example, a fifth embodiment example for a laser protection foil 3 is a plastic foil which is provided with an electrically conductive layer on one side and with electric conductor paths on the other side. Current flows through both of these or a voltage is applied to both. When struck by laser radiation, the plastic foil located therebetween melts locally so that the layer and the conductor path come into contact with one another and cause a short circuit.

In a sixth embodiment example, the material of the laser protection foil 3 is a material that is transparent to the laser radiation and is coated on both sides with a highly reflective layer. An impinging laser beam destroys the highly reflective layer due to its energy density at the point of incidence, is then dispersed in the transparent material and strikes a radiation sensor integrated in the transparent material.

Embodiment examples two to five basically show laser protection foils in which the foil itself forms only one layer. They differ from a laser protection foil 3 according to the first embodiment example in that additional elements are provided and in that the laser protection foil 3 can be glued to the passive laser protection wall 1 or arranged thereon by means of some other material engagement. Although this may be time-consuming to exchange, no additional holding elements or tensioning elements are necessary. The laser protection foil 3 can be placed on any curved passive laser protection walls 1.

According to a seventh embodiment example, the laser protection foil 3 is a double-foil which is formed by at least one gas-filled hollow chamber, and the laterally adjoining foil layers are advantageously connected to one another in more than one place by webs so as to keep the hollow chambers flat even under above-atmospheric pressure. A pressure transducer is connected in or to every hollow chamber. The gas pressure in the hollow chambers is higher than the ambient pressure so that when a hollow chamber is destroyed the internal pressure drops and when the measured pressure falls below a threshold value a threshold switch 5 connected to the pressure transducer switches off the laser 2.

A laser protection foil 3 is preferably formed by only one hollow chamber. In this way, only one pressure transducer is needed.

It is also conceivable to measure sound signals generated by the destruction of the hollow chamber which is under pressure and to use the sound signal as a signal for switching off the laser 2. A sound signal of this kind is also detectable when a stretched laser protection foil 3 according to the first embodiment example is destroyed and could also be used as a switching signal.

In an eighth embodiment example, the hollow chambers are filled with a special gas which exits and can be detected when the hollow chamber is destroyed. For this purpose, it is advantageous when the hollow chamber has the greatest possible volume so that the exiting gas can be detected by a gas detector as quickly as possible.

In particular, laser protection foils 3 according to the seventh and eighth embodiment examples afford the possibility of collapsible, freestanding booths. For this purpose, each of the individual, e.g., four, side walls which are joined to one another lengthwise preferably comprises only one hollow chamber with an inlet valve by which the hollow chambers are filled with gas at the setup location. In the hazardous area, which does not generally extend in height substantially beyond the maximum height of a person, passive laser protection walls 1 are added to the laser protection foils 3.

A laser protection booth of the type mentioned above is an economical and time-saving protection solution particularly for occasional use of lasers in certain locations.

In a ninth embodiment example, the laser protection foil 3 is a bubble foil, i.e., it comprises a plurality of small hollow chambers. In this case, in contrast to the first and seventh embodiment examples, a series of acoustic signals is initiated when a laser beam moves over the laser protection foil 3 due to faulty control. In order to prevent defects in the individual chambers or bubbles from being overlooked, the latter are advantageously separated from one another by thin channels or by walls with poor permeability to gas. For example, the bubbles can be arranged in a honeycomb structure with semipermeable dividing walls. While the chamber pressure is increased so sharply by a sudden impingement of laser radiation that a shock wave is initiated, which also destroys neighboring chambers or bubbles, any other kind of defect in a chamber or a bubble becomes noticeable in that the pressure in the entire laser protection foil drops due to the pressure equilibrium taking place.

When switching off a laser as a consequence of acoustic signals, it is important that these signals differ significantly from the sounds generated by laser material processing. The signals are reinforced by one or more suitably arranged microphones and initiate a cutoff. The microphones must be distributed in such a way that at least one microphone is always reached by an airborne or structure-borne sound sufficiently quickly after the impingement of the laser pulse.

While the foregoing description and drawings represent the present invention, it will be obvious to those skilled in the art that various changes may be made therein without departing from the true spirit and scope of the present invention.

REFERENCE NUMBERS

1 passive laser protection wall
2 laser
3 laser protection foil
4 sensor
5 threshold switch
6 energy source

What is claimed is:

1. A laser protection arrangement with a safety cutoff, comprising:
   a passive laser protection wall which stores the radiation energy of impinging radiation of a laser of a laser material processing installation;
   a laser protection foil which comprises an expandable plastic and is fixed in an expanded state and undergoes a detectable change when struck by laser radiation being arranged in front of the passive laser protection wall in the direction of the laser radiation; and
   at least one sensor being connected to the laser by a threshold switch in order to switch off the laser when a detector signal received by the at least one sensor exceeds or falls below a predetermined threshold value.

2. The laser protection arrangement according to claim 1; wherein the sensor is an expansion sensor.

3. The laser protection arrangement according to claim 2; wherein the laser protection foil is expanded in only one direction and the expansion sensor is an expansion measurement strip which is glued on in the expansion direction so that when struck by laser radiation the laser protection foil is destroyed at the point of incidence and a tear extends perpendicular to the expansion direction and leads to a drop in the tensile strain which is determined as a threshold value.

4. The laser protection arrangement according to claim 1; wherein the sensor is an acoustic sensor.

5. A laser protection arrangement with a safety cutoff, comprising:
   a passive laser protection wall which stores the radiation energy of impinging radiation of a laser of a laser material processing installation;
   a laser protection foil with integrated optically conducting fibers comprising a fiber core and a fiber cladding, the laser protection foil undergoing a detectable change when struck by laser radiation being arranged in front of the passive laser protection wall in the direction of the laser radiation; and
   at least one sensor being connected to the laser by a threshold switch in order to switch off the laser when a detector signal received by the at least one sensor exceeds or falls below a predetermined threshold value.

6. A laser protection arrangement with a safety cutoff, comprising:
   a passive laser protection wall which stores the radiation energy of impinging radiation of a laser of a laser material processing installation;
   a laser protection foil which is a double foil that is formed by at least one gas-filled hollow chamber, the laser protection foil undergoing a detectable change when struck by laser radiation being arranged in front of the passive laser protection wall in the direction of the laser radiation, the laser protection foil being configured to be exchangeable with another laser protection foil without having to exchange the passive laser protection wall with another passive laser protection wall; and
   at least one sensor being connected to the laser by a threshold switch in order to switch off the laser when a detector signal received by the at least one sensor exceeds or falls below a predetermined threshold value.

7. The laser protection arrangement according to claim 6; wherein the at least one hollow chamber is filled with a gas which can be detected, and the sensor is a gas sensor.

8. The laser protection arrangement according to claim 7; wherein an overpressure exists in the at least one hollow chamber and the sensor is a pressure sensor.

9. The laser protection arrangement according to claim 7; wherein the double foil forming the at least one hollow chamber is connected by a plurality of webs so that the expansion of the chamber is limited by the height of the webs.

10. A laser protection arrangement with a safety cutoff, comprising:
    a passive laser protection wall which stores the radiation energy of impinging radiation of a laser of a laser material processing installation;
    a laser protection foil which is a bubble foil, the laser protection foil undergoing a detectable change when struck by laser radiation being arranged in front of the passive laser protection wall in the direction of the laser radiation; and
    at least one sensor being connected to the laser by a threshold switch in order to switch off the laser when a detector signal received by the at least one sensor exceeds or falls below a predetermined threshold value.

* * * * *